(12) United States Patent
Hendrix

(10) Patent No.: US 6,458,301 B1
(45) Date of Patent: Oct. 1, 2002

(54) METHOD FOR FORMING WEATHERSEALS FROM AN INTERCHANGEABLE INSERT DIE ASSEMBLY

(75) Inventor: Raymond E. Hendrix, Lenoir City, TN (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 09/940,131

(22) Filed: Aug. 27, 2001

(51) Int. Cl.[7] .............................................. B29C 47/12
(52) U.S. Cl. ...................... 264/141; 264/148; 264/150; 264/167; 264/171.14; 264/172.1; 425/131.1; 425/185; 425/190
(58) Field of Search ................................ 264/148, 141, 264/150, 171.13, 171.14, 172.1, 173.17, 167, 177.1, 209.1, 209.2; 425/113, 131.1, 185, 190, 381

(56) References Cited

U.S. PATENT DOCUMENTS

| | | | |
|---|---|---|---|
| 3,780,152 A | 12/1973 | Friesner | |
| 3,856,446 A | * 12/1974 | Schultz | ........................ 425/113 |
| 4,042,741 A | 8/1977 | Bright | |
| 4,358,261 A | 11/1982 | Ohki | |
| 4,457,685 A | 7/1984 | Huang et al. | |
| 4,584,150 A | 4/1986 | Ballocca | |
| 4,765,936 A | 8/1988 | Ballocca | |
| 4,960,375 A | 10/1990 | Saito et al. | |
| 5,137,675 A | 8/1992 | Rabe | |
| 5,162,090 A | 11/1992 | Arima | |
| 5,229,054 A | * 7/1993 | Yada et al. | ................. 264/167 |
| 5,267,846 A | 12/1993 | Miyama et al. | |
| 5,447,670 A | 9/1995 | Ito et al. | |
| 5,679,303 A | 10/1997 | Hayashi et al. | |
| 5,733,491 A | 3/1998 | Grosset et al. | |
| 5,965,075 A | 10/1999 | Pauley et al. | |
| 6,017,477 A | 1/2000 | Lu et al. | |

* cited by examiner

Primary Examiner—Mark Eashoo
(74) Attorney, Agent, or Firm—Brian B. Shaw, Esq.; Stephen B. Salai, Esq.; Harter, Secrest & Emery LLP

(57) ABSTRACT

A method for forming a composite extrusion is disclosed, wherein a continuous length is formed having a leading length and a trailing length, the leading length including the primary extrudate and a first appendage extrudate and the trailing length including the primary extrudate and a second appendage extrudate, wherein the first appendage extrudate and the second appendage extrudate are formed form corresponding interchangeable first and second insert dies. The continuous length of the composite extrusion includes (i) the leading length having the primary extrudate and the first appendage extrudate; (ii) a change over length having the primary extrudate; and (iii) the trailing length having the primary extrudate and the second appendage extrudate, wherein a plurality of individual weatherseals can be cut from the leading length, and a plurality of weatherseals can be cut from the trailing length.

41 Claims, 6 Drawing Sheets

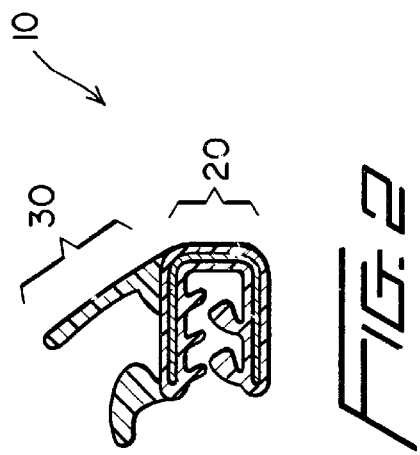
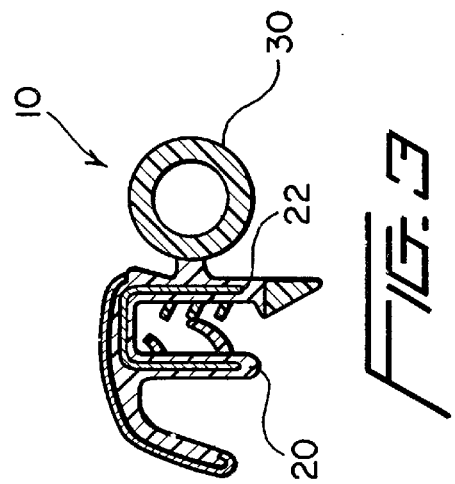
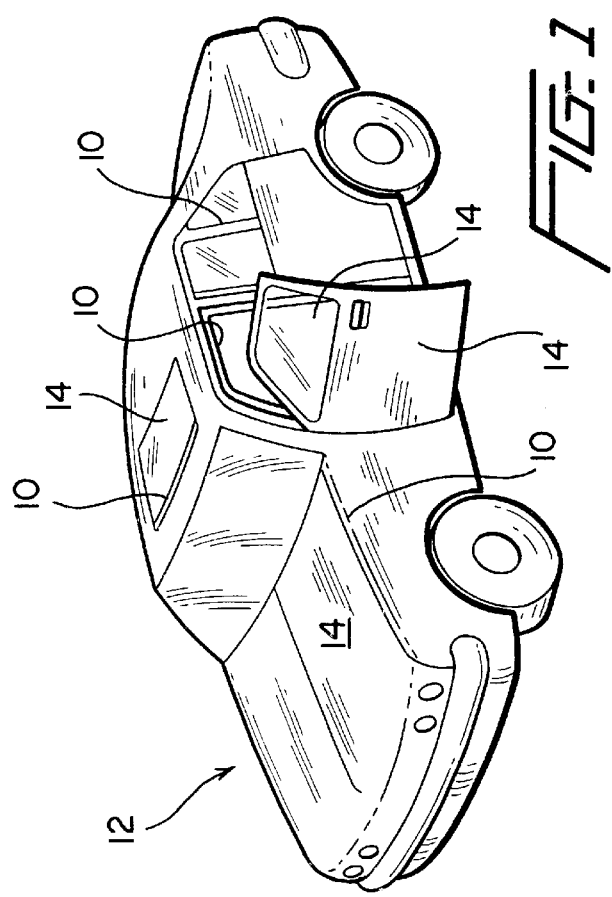
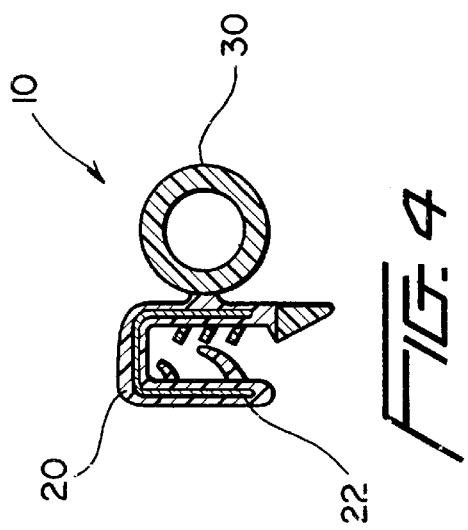

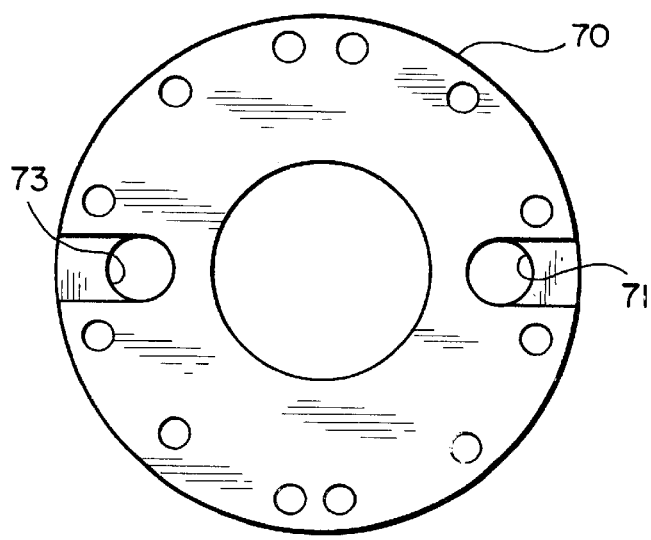
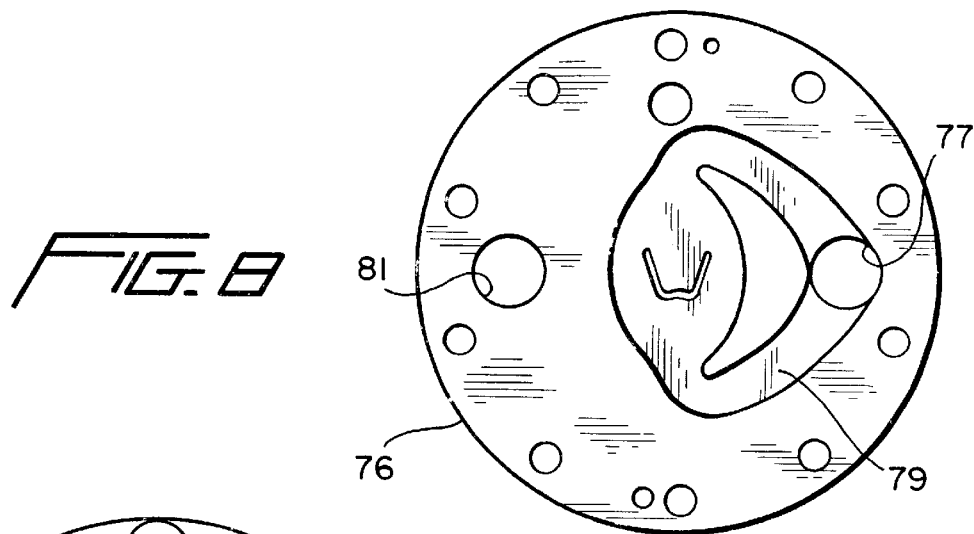
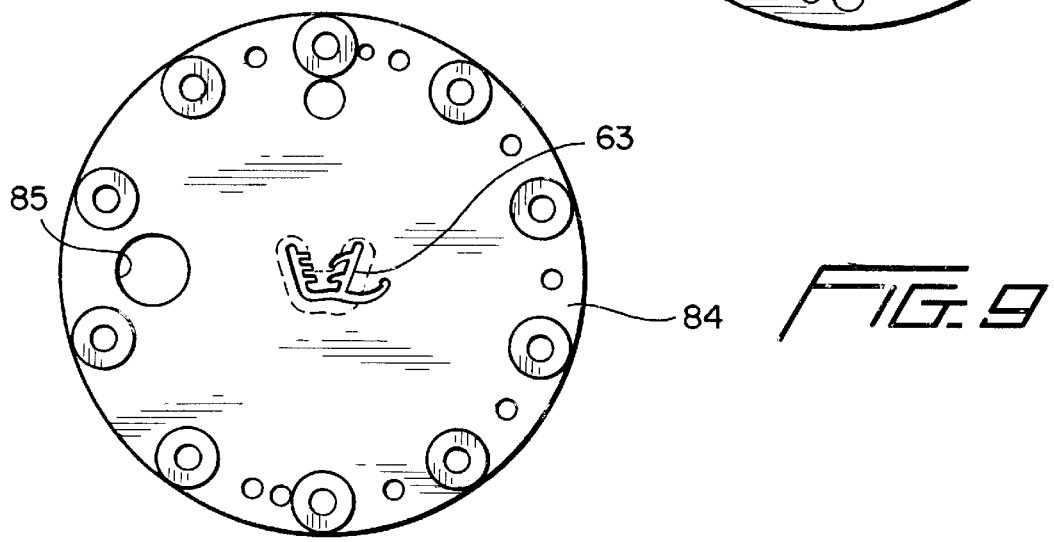

METHOD FOR FORMING WEATHERSEALS FROM AN INTERCHANGEABLE INSERT DIE ASSEMBLY

FIELD OF THE INVENTION

The present invention relates to extruded weatherseals formed of a primary extrudate and an appendage extrudate, and more particularly, to forming a continuous length of a composite extrusion having a leading length and a trailing length, the leading length including the primary extrudate and a first appendage extrudate and the trailing length including the primary extrudate and a second appendage extrudate, wherein the primary extrudate is formed from a primary die block and the first appendage extrudate and the second appendage extrudate are formed from corresponding first and second insert dies interchangeably connected to the primary die block.

BACKGROUND OF THE INVENTION

Weatherseals are employed in vehicles in a variety of locations to perform the functions of sealing and noise reduction. Traditional weatherseals may have any of a variety of constructions for performing the desired sealing. It is understood the sealing function can include reducing infiltration of water, air or particles across the barrier. Further, a portion of these weatherseals are often colored to enhance the aesthetic quality of the weatherseal.

Typically, the weatherseal must be retained relative to the vehicle to locate a sealing portion in a predetermined location. A number of weatherseal constructions engage a flange on the vehicle to be retained by the vehicle. However, the location of the sealing portion is vehicle model or line specific. Therefore, weatherseals are usually uniquely constructed for a given model to provide a sealing interface. This unique construction requires the use of multiple extrusion dies, which results in the corresponding downtimes of the production lines as the dies are switched. These custom requirements add significant cost to the resulting weatherseal.

Therefore, the need exists for a weatherseal construction that can reduce the number of unique features required for a given application and installation of a weatherseal. The need exists for the manufacture of common features of weatherseals, while providing for the weatherseal to be readily adaptable to form any necessary unique features. The need exists for a method of manufacturing different weatherseals, wherein the weatherseals can include a common portion, section or component.

SUMMARY OF THE INVENTION

The method of the present invention provides for the formation of a composite extrusion having a primary extrudate, a first appendage extrudate and a second appendage extrudate. In a preferred construction, the continuous composite extrusion includes a leading length and a trailing length, wherein the leading length has a cross section including the primary extrudate and the connected first appendage extrudate, and the trailing length has a cross section that includes the primary extrudate and the connected second appendage extrudate. The primary extrudate is formed in a primary die block, wherein the first appendage extrudate and second appendage extrudate are formed from corresponding insert dies interchangeably connected to the primary die block. The first and second insert dies are removably and operably connected to the primary die block without interrupting or requiring modification of the extrusion of the primary extrudate through the primary die block.

In one configuration, the leading length of the continuous composite extrusion is formed by extruding a common carrier or gripping portion from a primary die block simultaneous with the extrusion of a first sealing profile through a first interchangeable insert die, and the trailing length is formed upon exchanging the first insert die with a second insert die during the extruding of the common carrier to form a second sealing profile with the common carrier. For example, the leading length has cross section for installation in a first vehicle model and the trailing length has a cross section for installation in a second vehicle model.

Typically, the continuous extrusion of the leading length and the trailing length has a total length on the order of tens or hundreds of thousands of feet. The individual weatherseals for installation in a vehicle generally have a length of about 10 to 12 feet, and are cut from one of the leading length or the trailing length of the continuous extrusion. Thus, thousands of individual weatherseals can be cut from the leading length or the trailing length.

The present invention allows continuous formation of a universal or standardized portion the primary extrudate of a weatherseal, wherein uniquely configured sealing or trim portions (appendage extrudates) can be selectively integrated without interrupting formation of the standardized portion. That is, the first insert die can form a first appendage extrudate having a given cross section, wherein the second insert die can replace the first insert die to form a second appendage extrudate of a completely different cross section, without (i) interrupting formation of the primary extrudate, (ii) requiring adjustment of the primary extrudate or (iii) adjusting the operating parameters forming the primary extrudate during the change over from the first insert die to the second insert die.

BRIEF DESCRIPTION OF THE DRAWINGS

FIG. 1 is a perspective view of an automobile employing a weatherseal manufactured by the present invention.

FIG. 2 is a cross sectional view of a first weatherseal.

FIG. 3 is a cross sectional view of an alternative weatherseal.

FIG. 4 is a cross sectional view of a further weatherseal.

FIG. 7 is a plan view of a subplate of a primary die block.

FIG. 8 is a plan view of a D plate of the primary die block.

FIG. 9 is a plan view of a C plate of the primary die block.

DETAILED DESCRIPTION OF THE PREFERRED EMBODIMENT

Figure 5:
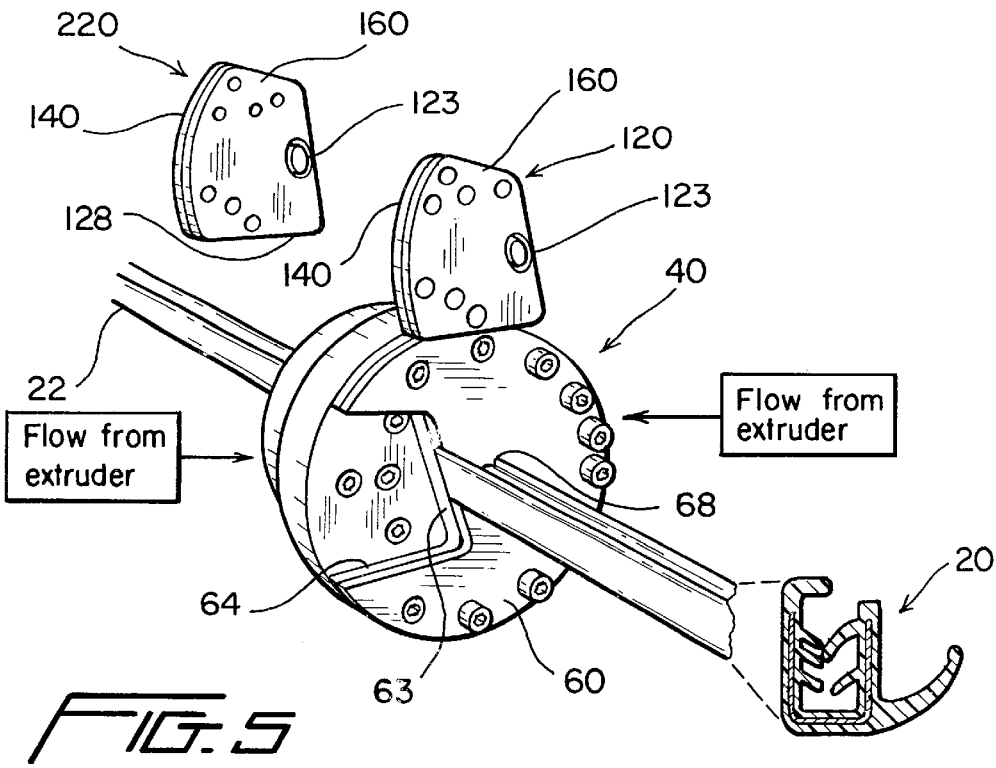
FIG. 5 is a perspective view of a primary die block and a set of interchangeable insert dies.

Referring to FIG. 1, the weatherseal 10 of the present invention can be employed in a motor vehicle 12. The weatherseal 10 can be used in a variety of locations for engaging a panel 14.

Typically, the weatherseal 10 is disposed between confronting surfaces such as panels 14. The panels 14 may be any of a variety of materials and do not limit the present invention. For example, the panel 14 may be glass, metal or a composite, which is painted, surface treated or bare. In the operating environment, the panel 14 can be brought repeatedly into and out of engagement with the weatherseal 10. Further, the weatherseal 10 and the panel 14 may be located in a substantially fixed relationship. For example, the weatherseal 10 may be located about a fixed panel 14 such as a front or rear window.

For purposes of description, the present invention is described as a weatherseal, however, it is understood the present invention can be employed in a non sealing application such as a trim piece. Thus, the term weatherseal includes, but is not limited to, extrusions, moldings, edge pieces, glass guidance components, glass run channels, weather strips and seals including channel mount or pin type mounted seals. The present weatherseal 10 may be used as a weather strip in structural sealing applications including residential and commercial buildings, marine vehicles as well as the motor vehicle industry. In the motor vehicle industry, the weatherseal configuration is suitable for use in many areas including, but not limited to, storage compartments, glass guidance components, glass run channels, door seals, roof rails, deck lids, hood to cowl seals, belt line seals, fixed window seals, windshields, front hood seals, window seals, sun roof seals, van sliders, hatch backs or window channel seals. It is understood the weatherseal can be constructed and operably located in a position that does not perform a sealing function. One example of such non sealing application is a flange finisher, trim or trim piece. Typical flange finishers are disposed on a flange to provide an aesthetically pleasing appearance, as well as reduce the risks associated with an otherwise exposed flange. For purposes of clarity, the present description is set forth in terms of weatherseals, however, this is not intended to limit the scope of the invention.

Referring to FIGS. 2–4, the weatherseals 10 formed by the present die assembly can include a first portion, such as a gripping portion 20 and a second portion, such as a sealing portion 30, wherein the gripping portion is a first or primary extrudate and the sealing portion is a second or appendage extrudate. The gripping portion 20 and sealing portion 30 can have of a variety of configurations and cross sectional profiles.

The gripping portion 20 can have any of a variety of cross sectional profiles including a generally "U ", shaped, "J" shaped, "L" shaped, "S" shaped, "T" shaped or planar profile. Typically, the particular profile is at least partially determined by the intended operating environment of the weatherseal 10. For purposes of description, the present weatherseal 10 is shown having a U shaped gripping portion 20.

The gripping portion 20 can be formed to include a reinforcing member 22 such as a carrier. The carrier can include a metal such as a knitted or a serpentine wire, or a stamped, formed or cut metal. It is understood the reinforcing member 22 can be a plastic such as a thermoplastic. The rigidity, resiliency and malleability of the reinforcing member 22 is selected in view of the intended installation and operating parameters of the weatherseal 10.

In a preferred configuration, the gripping portion 20 has a generally U shape cross section, with the formable reinforcing member 22. That is, the reinforcing member 22 can be deformed into alternative orientations and retain the deformed configuration. Thus, the reinforcing member 22, and hence gripping portion 20, can be initially formed in, or to a splayed position and subsequently deformed to a parallel or intersecting position. The gripping portion 20, and weatherseal 10, can thereby operably engage a variety of flange thicknesses. Further, the U shaped profile has a sufficient depth, leg length to accommodate a substantial range of flange heights.

The gripping portion 20 can be formed of a variety of materials including thermoplastics or thermosets. The thermoplastics can include thermoplastic elastomers, thermoplastic vulcanizates, polyethylene, ethylene vinyl acetate, polyvinyl chloride or polypropylene. Thermoset materials include, but are not limited to EPM, EPDM, EPDM blended with chlorobutyl, nitrile blended with EPDM, SBR and polychloroprene. These materials of the gripping portion 20 can be employed in a dense or foamed (sponge) construction.

The sealing portion 30 can have any of a variety of cross sections including, but not limited to barbs, bulbs, lips, fingers, fins, flanges or ribs. The sealing portion 30 can include one of these features, or multiple features, wherein the multiple features are the same or different features.

The sealing portion 30 can be formed from any of a variety of materials including, but not limited to thermoplastic and thermoset materials. The sealing portion can be formed of the same material as the gripping portion, or be formed of a separate material. Thus, the sealing portion can be formed of thermoplastic elastomers, thermoplastic vulcanizates, polyethylene, ethylene vinyl acetate, polyvinyl chloride or polypropylene. Thermoset materials include, but are not limited to EPM, EPDM, EPDM blended with chlorobutyl, nitrile blended with EPDM, SBR and polychloroprene. Further, these materials of the sealing portion 30 can be employed in a dense or foamed (sponge) construction.

Figure 6:
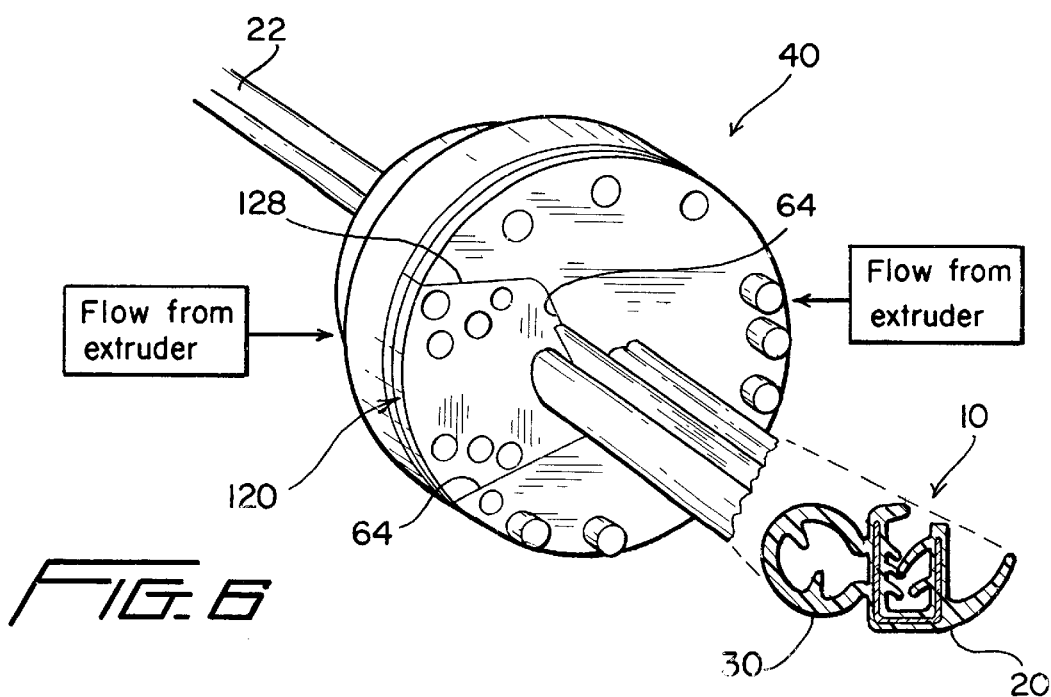
FIG. 6 is a perspective view of the primary die block and the insert die in an operable orientation.

Referring to FIGS. 5 and 6, the present die assembly 40 includes a primary die block 60 and a first insert die 120. The primary die block 60 and the first insert die 120 are selected to be operably engaged to form the primary extrudate and the appendage extrudate which are joined in the die assembly to form a unitary weatherseal 10 (FIG. 6).

It is recognized the first portion (primary extrudate) can be other than the gripping portion 20 and the second portion (appendage extrudate) can be other than the sealing portion 30, however for purposes of description, the die assembly 40 is set forth as the primary extrudate being the gripping portion and the appendage extrudate being the sealing portion. Further, although the invention is described in terms of the primary extrudate or gripping portion 20 being formed by the primary die block 60 and the first appendage extrudate or sealing portion 30 being formed by the first insert die 120, it is understood the primary die block can be configured to form the sealing portion and the insert die can form the gripping portion.

Further, the die assembly 40 is described in terms of a single gripping portion 20 and a single sealing potion 30, wherein the cross section of the sealing portion is changed between the leading length of the weatherseal and the trailing length of the weatherseal by changing the insert die.

Further, it is understood multiple insert dies can be simultaneously used to form multiple sealing portions 30 on a length of the weatherseal 10. Alternatively, multiple sealing portions 30 can be simultaneously formed on a length of the weatherseal 10 through a single insert die 120. The composite extrusion, from which an individual weatherseal 10 is cut, is formed of a continuous length having a leading length and a trailing length, wherein the leading length has a cross section which includes the primary extrudate and the first appendage extrudate, and the trailing length has a cross section which includes the primary extrudate and a second appendage extrudate, the primary extrudate having constant cross section throughout the continuous length of the weatherseal. Thus, there is a change over the length along which the primary extrudate extends, while the first insert die is being replaced with the second insert die. Hence, the appendage extrudates are discontinuous between the leading length and the trailing length.

In a first configuration, the primary die block 60 includes a seating surface 64 and a supporting channel 68 downstream of the primary die orifice 63 as seen in FIG. 5. The primary die block 60 includes a first material inlet and defines the primary die orifice 63 fluidly connected to the first material inlet.

The first material inlet is connected or connectable to a corresponding extruder. The primary die block 60 can include an inlet for receiving the reinforcing member 22.

The primary die orifice 63 defines a closed periphery for forming the first extrudate. The term "closed periphery" defines a continuous periphery of the orifice. That is, the orifice is topologically equivalent to a circle. Therefore, the extrudate formed by the primary die orifice having a closed periphery has a predetermined and constant cross section. Thus, the resulting extrudate has a cross section fully defined by passing through the respective die orifice, and is independent of an extrudate passing through a different orifice. In contrast, a die orifice having an open periphery cannot form an extrudate that is independent of a second extrudate.

Figure 10:
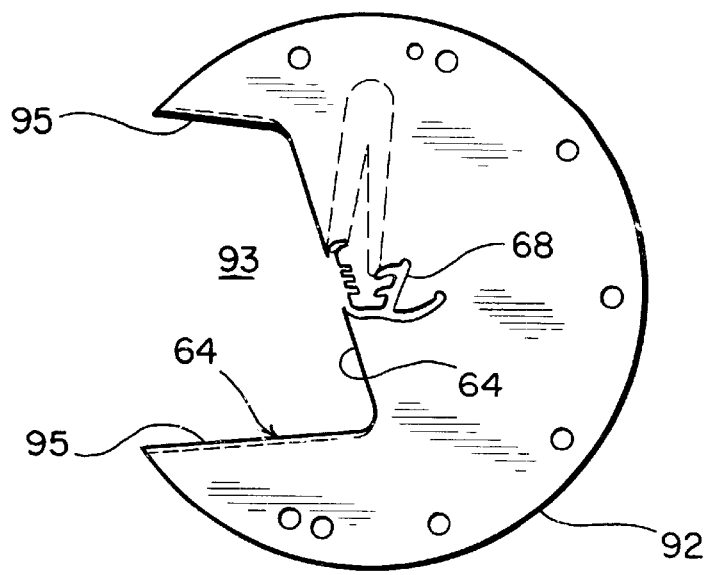
FIG. 10 is a plan view of a B plate of the primary die block.
Figure 11:
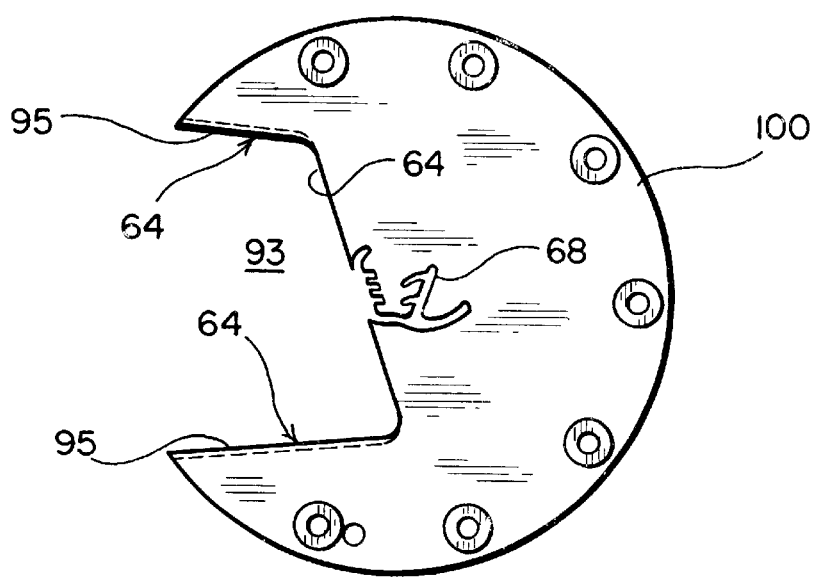
FIG. 11 is a plan view of an A plate of the primary die block.

The seating surface 64 defines at least one contact point, and preferably, a three dimensional surface for contacting and locating the first insert die 120 relative to the primary die block 60. The seating surface 64 can include any of a variety of structures, including but not limited to detents, stops, flanges, channels, ridges, tapers or shoulders. As seen in FIGS. 5 and 6, the seating surface 64 is a recess in the primary die block 60, wherein the recess is non symmetrical, thereby defining a single operable orientation of the first insert die 120 and the primary die block 60. Preferably, the seating surface 64 includes a taper or inclined surface 95, wherein the tapered surface is converging along the extrusion path. Referring to FIGS. 10 and 11, the taper along the periphery of the recess is shown. Alternatively, the primary die block 60 can include shoulders for engaging the insert die 120.

The supporting channel 68 has a profile sufficiently similar to the primary die orifice 63 to substantially preclude permanent deformation or flexure of the first extrudate along the support channel. That is, the cross section of the primary extrudate is defined (formed) by the primary die orifice 63, however, the support channel 68 is generally concentric with and spaced downstream of the primary die orifice.

The primary die block 60 can have a variety of constructions including, but not limited to, a plurality of die plates, a machined block, a cast block or a molded block. For purposes of description, the primary die block is described in terms of a plurality of die plates, wherein the die plates include surface features (machined, molded or formed) to provide the pathways for material flow.

As shown in FIGS. 7–11, in the die plate construction, the primary die block includes a subplate 70 (FIG. 7), a D plate 76 (FIG. 8), a C plate 84 (FIG. 9), a B plate 92 (FIG. 10) and an A plate 100 (FIG. 11).

Referring to FIG. 7, the subplate 70 includes fittings or couplings for operably and fluidly connecting to at least one extruder for providing material to the first die orifice. That is, the subplate 70 includes a first material inlet 71 The subplate 70 of FIG. 7 also includes a fitting or coupling for operably and fluidly connecting to a second extruder for providing material to the insert die 120. Thus, the subplate 70 includes a second material inlet 73.

As shown in FIG. 8, the D plate 76 connects to the subplate 70 and includes an inlet 77 and a flow channel 79 for directing material from the inlet. The D plate also includes a flow path 81 for the second material.

Referring to FIG. 9, the C plate 84 connects to the D plate 76 and includes the primary die orifice 63 for forming the profile of the first extrudate. The C plate 84 also includes a material flow path 85 for passing material from the second extruder to the insert die 120.

As shown in FIG. 10, the B plate 92 connects to the C plate 84 and defines a length of the support channel 68. The B plate 92 can include a secondary orifice for depositing a secondary layer or on portions on the primary extrudate. The B plate 92 also includes a recess 93 which defines a part of the seating surface 64. The recess 93 can be configured to engage a corresponding surface or periphery of the insert die 120. The taper surface 95 is located along a periphery of the recess 93. However, it is understood, the sealing surface 64 can include a shoulder or rib for aligning, engaging and retaining the insert die 120.

Referring to FIG. 11, the A plate 100 is connected to the B plate 92 and defines a further length of the support channel 68. The A plate 100 includes a recess 101 which defines a part of the seating surface 64. The recess 101 can be configured to engage a corresponding surface or periphery of the insert die 120. The recess 101 also includes a tapered surface having a converging orientation along the extrusion path. Alternatively, the seating surface 64 can include a shoulder or rib for aligning, engaging and retaining the insert die 120.

Although the primary die block 60 is set forth in terms of a fixed orifice assembly, it is understood the primary die block can include a variable orifice or variable shaping feature. Although the primary die block 60 is shown having a material flow path for the material of the appendage extrudate, the insert die 120 can be directly connected to a corresponding extruder.

The first and second insert dies 120, 220 are selected to cooperatively engage the primary die block 60, and form corresponding first and second appendage extrudates. Typically, the first and second insert dies 120, 220 will have substantially identical structures, and vary predominately in the configuration of the respective die orifice. That is, the first and second insert dies can form corresponding appendage extrudates of different cross sections. Therefore, only the first insert die 120 will be described in detail as it is understood the second insert die 220 includes corresponding structure as would understood by one of ordinary skill in the art.

As seen in FIG. 5, the first insert die 120 includes a first appendage die orifice 123 and a mating surface 128. The first insert die 120 includes a material inlet for receiving material passing through the A plate 100. However, it is understood the first insert die 120 can be connected directly to a corresponding extruder, without having the material passing through the primary die block 60.

As seen in FIGS. 5, 6, 14 and 16, the first appendage die orifice 123 defines a first appendage extrudate, such as the sealing portion 30. Preferably, the first insert die 120 and the primary die block 60 are selected to locate the first appendage die orifice 123 along the longitudinal dimension of the support channel 68.

The insert die 120, 220 can also have a variety of constructions, including but not limited to, a plurality of die plates, a machined block, a cast block or a molded block. For purposes of description, the insert die is set forth in terms of a plurality of die plates, wherein the plates include surface features (machined, molded or formed) to provide the pathways for material flow.

Figure 13:
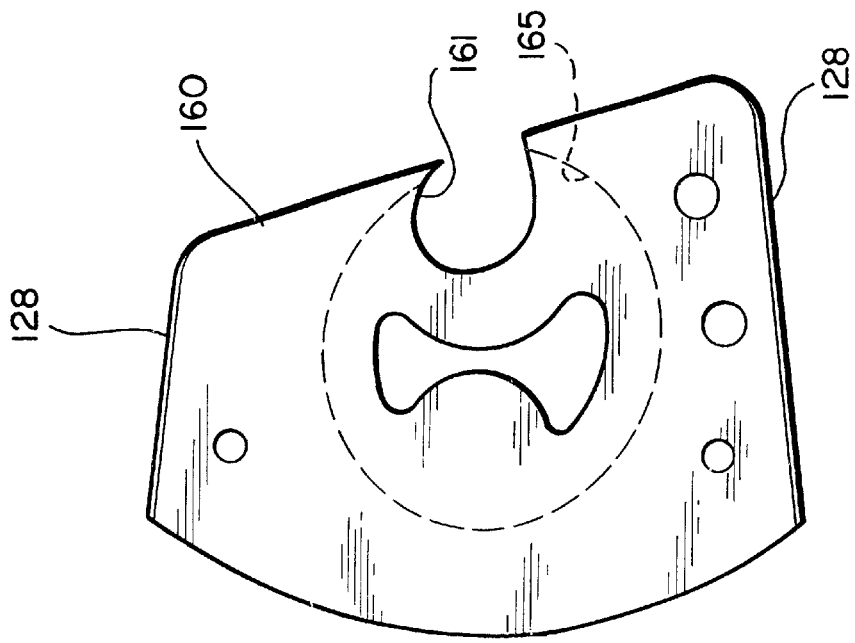
FIG. 13 is a plan view of an A plate for an insert die.
Figure 12:
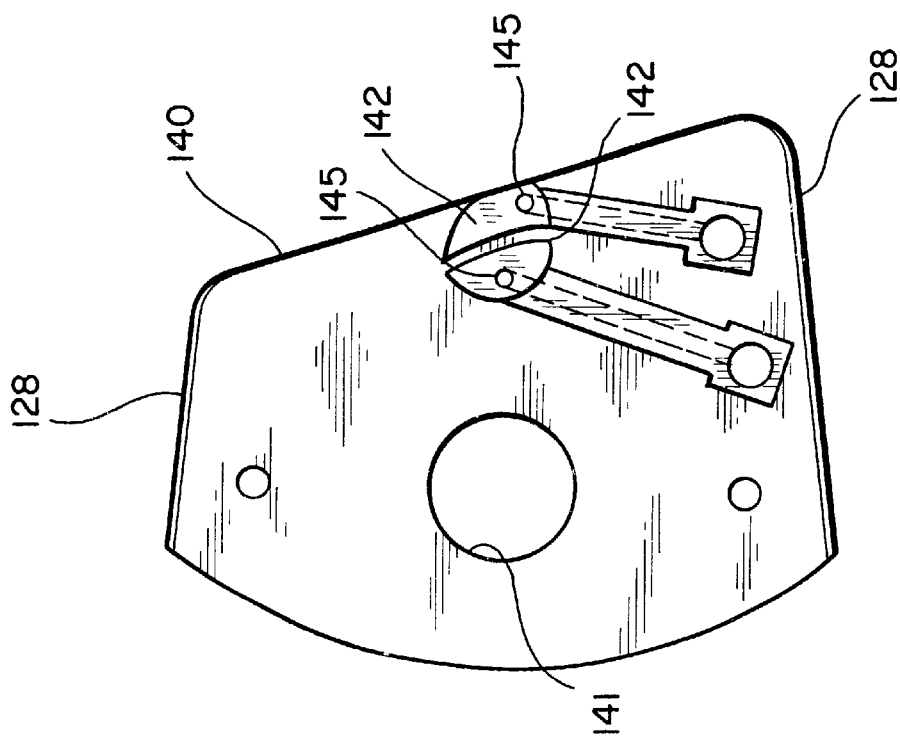
FIG. 12 is a plan view of a B plate of r an insert die.
Figure 14:
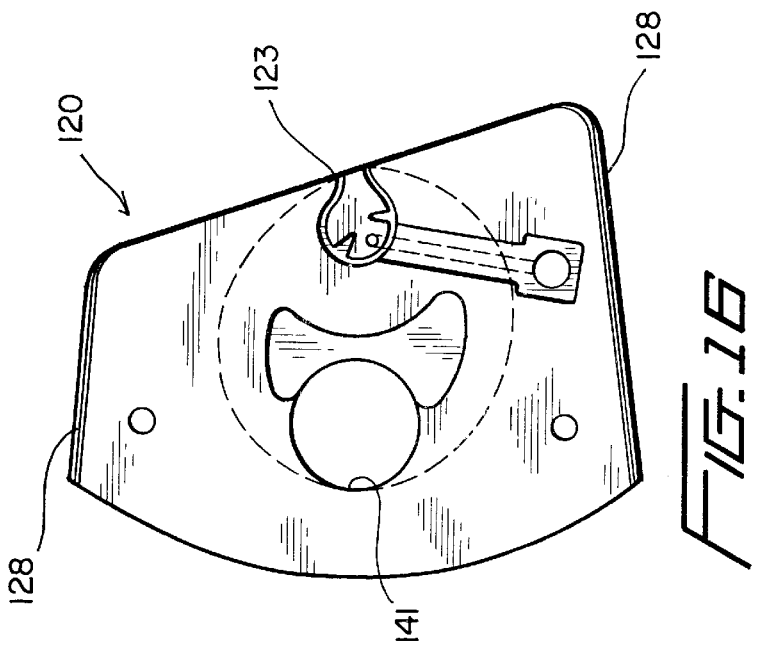
FIG. 14 is a front elevational view of an insert die for forming an appendage extrudate.
Figure 15:
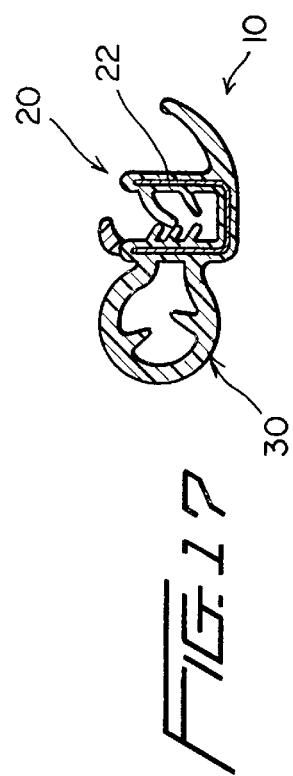
FIG. 15 is a cross sectional view of a weatherseal including the extrudate formed by the insert die of FIG. 14.
Figure 16:
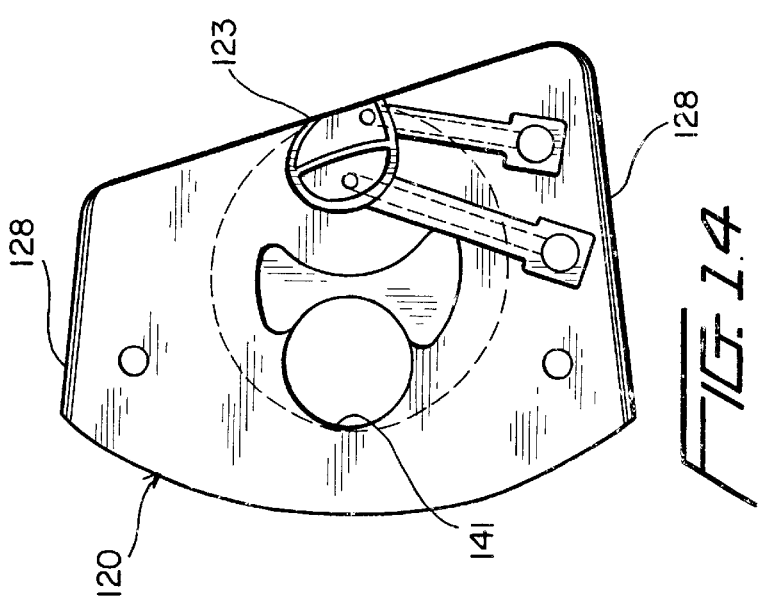
FIG. 16 is a front elevational view of an alternative insert die for forming a an appendage extrudate.
Figure 17:
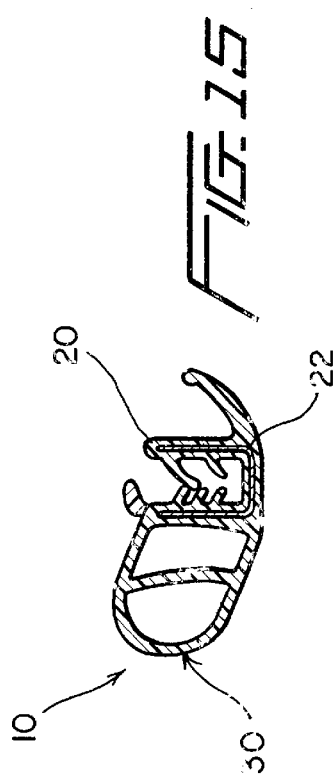
FIG. 17 is a cross sectional view of a weatherseal including the appendage extrudate formed by the insert die of FIG. 16.

As shown in FIGS. 12 and 13, the insert die can be formed of a B plate 140 and an A plate 160. Although either plate 140 or 160 can be constructed to define the appendage die orifice, the present insert die is described in terms of the appendage die orifice being formed by cooperative structures on the B plate 140 and the A plate 160.

The B plate 140 includes a material inlet 141 and a shaping plug 142. The shaping plug 142 can include vents or ports 145 for exposing the appendage extrudate to pressurized air. A portion of the periphery of the B plate forms the mating surface 128 for engaging the seating surface 64 of the primary die block 60.

The A plate 160 includes a die forming recess 161 sized to encompass a portion of the shaping plug 142. The A plate 160 also includes a material flow path 165 for directing material to the recess 161 and about the die plug 142. A portion of the periphery of the A plate 160 also forms a part of the mating surface 128 of the insert die for engaging the primary die block 60. Preferably, the A plate 160 and B plate 140 include corresponding tapered mating surfaces for engaging the converging surfaces of the primary die block 60. The orientation of the converging surfaces urges the insert die 120 against and operably into engagement with the primary die block 60 upon the flow of material through the insert die. That is, the material flow causes the insert die 120 to seat against the primary die block 60. It is understood the insert die 120 can be a variable orifice die, thereby allowing the respective appendage extrudate to vary in cross section along the corresponding length of the composite extrusion. The control of such variable orifice can be in response to any of a variety of parameters, including but not limited to length, timing, or sensors.

Alternatively, one or both of the B plate 140 and the A plate 160 can include a channel or groove for receiving the corresponding shoulder on the primary die block.

The mating surface 128 is selected to cooperatively engage the seating surface(s) 64 to operably align the first insert die 120 and the primary die block 60. As shown in FIGS. 5, 6, 12, 13, 14 and 16, the mating surface 128 includes a converging taper along a periphery or portion of the periphery of the first insert die 120. Referring to FIGS. 5, 10–14 and 16, the mating surface 128 is non symmetrical to provide a single operable alignment of the primary die block 60 and the first insert die 120.

Upon operable alignment of the primary die block 60 and the first insert die 120, the first appendage die orifice 123 is located along the longitudinal dimension of the support channel 68. The primary die orifice 63 forms the primary extrudate independent of material passing through the first appendage die orifice 123 and the first appendage die orifice forms the first appendage extrudate to contact the primary extrudate.

Preferably, the primary die block 60 and the insert dies 120, 220 are configured to urge the primary extrudate and the appendage extrudates together (the gripping portion against the sealing portion) along the support channel 68. The materials and processing parameters are selected to bond/fuse the primary extrudate to the appendage extrudate, thereby forming a unitary integral one piece composite extrusion from which the weatherseal 10 can be cut to include the gripping portion 20 and sealing portion 30. That is, the primary extrudate and the appendage extrudate can only be destructively separated.

As the primary die orifice 63 is independent of the first appendage die orifice 123 in the formation of the primary extrudate and die orifices are located in separate physical structures, the first insert die 120 can be removed and exchanged for the second insert die 220 without effecting formation of the primary extrudate. The formation of the primary extrudate is independent of the insert die 120, 220 being operably connected to the primary die block 60 and independent of formation of the appendage extrudate(s). That is, the formation of the appendage extrudate does not alter the cross section of the primary extrudate passing from the primary die orifice 63.

In a further configuration, the present die assembly 40 can include a locator downstream and spaced from the first die orifice 63 of the primary die block 60. The locator is selected to support a longitudinal section of the primary extrudate. The locator includes the seating surface(s). The mating surface of the insert die is located relative to the locator to dispose the appendage extrudate in contact with the primary extrudate.

Operation

In operation, a first material (for forming the gripping portion—primary extrudate) is fed into the first material inlet of the primary die block 60 and a second material (for forming the sealing portion) is fed into the second material inlet of the primary die block. The first material is forced through the primary die orifice 63 to form the primary extrudate. The profile of the primary extrudate being independent of passage of material through the first insert die 120 (and the first appendage die orifice 123).

The reinforcing member 22, can be fed into the primary die block 60 to be coated with the first material. However, it is also understood the primary extrudate can be formed without the reinforcing member 22.

The second material is forced through the primary die block 60 to the first insert die 120.

The primary extrudate passes from the primary die orifice 63 with a fully defined cross sectional profile independent of material flow through the first insert die 120.

The primary extrudate then passes along the support channel 68. If no material is passing through the first insert die 120, the primary extrudate, (the gripping portion), passes from the die assembly 40.

If the second material is passed through the first appendage die orifice 123 of the first insert die 120, the first appendage extrudate, (the sealing portion 30), is formed.

The first insert die 120 and the supporting channel 68 of the primary die block 60 are selected to urge the primary extrudate and the first appendage extrudate against each other along the support channel, and thereby bond the extrudates to form a composite extrusion.

Although a heat bond is employed, it is understood that supplemental adhesives can be employed.

It is contemplated the present die assembly 40 provides for the continuous formation of the gripping portion (primary extrudate), wherein the sealing portion (appendage extrudates) can be changed by interchanging the insert dies 120, 220.

Thus, the primary extrudate, the gripping portion 20, can be continuously formed while a leading length of the weatherseal 10 is formed with a first sealing portion 30 (first appendage extrudate) cross section via the first insert die 120, whereupon the first insert die is replaced with the second insert die 220 to provide a second different sealing portion (appendage extrudate) cross section which is joined to the primary extrudate along a trailing length of the weatherseal. Thus, the cross section of the composite weatherseal does not vary continuously from the leading length to the trailing length. That is, a discontinuity of the appendage extrudate exists between the leading length and the trailing length, while the primary extrudate maintains a continuous cross section (subject only to operation of a variable primary orifice, if employed).

Preferably, the operating parameters of the primary die block 60 are independent of the insert dies 120, 220. The primary extrudate is consistently formed, without influence of the insert dies being connected to the primary die block or formation of the appendage extrudates.

An advantage of the present invention is the ability to continuously form a universal or standardized primary extrudate, such as the gripping portion 20, wherein the appendage extrudate (sealing portion 30) can be changed without interrupting formation of the primary extrudate. Thus, the continuous formation of the primary extrudate obviates the need to restring, realign and readjust the extrusion process of the primary extrudate after a shut down as previously required to change dies. That is, each time an extrusion line is started a number of procedures are required to establish certain parameters, wherein subsequent adjustments are necessary to match operating parameters. As the primary extrudate is continuously formed, these procedures are not necessary.

Further, the present invention provides for the design of a common carrier, or gripping portion, that can be employed in a wide variety of installations, wherein the insert dies can be readily exchanged to provide the necessary unique sealing or appendage extrudate profiles.

In the present invention, the first insert die 120 can be used to form a leading length of weatherseal having a cross section defined by the primary extrudate and the first appendage extrudate, then the first insert die 120 can be replaced with the second insert die 220 for forming a trailing length of weatherseal having a second different cross section defined by the primary extrudate and the second appendage extrudate.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

What is claimed is:

1. A method of forming a composite extrusion, comprising:

(a) extruding a primary extrudate through a primary die block;

(b) extruding, during extrusion of the primary extrudate, a first appendage extrudate through a first die orifice of a first insert die coupled to the primary die block to contact the first appendage extrudate with the primary extrudate to form a leading length of the composite extrusion;

(c) replacing, during extrusion of the primary extrudate, the first insert die with a second insert die; and (d) extruding, during extrusion of the primary extrudate, a second appendage extrudate through a second die orifice of the second insert die to contact the second appendage extrudate with the primary extrudate to form a tailing length of the composite extrusion.

2. The method of claim 1, further comprising maintaining a constant cross section of the primary extrudate while extruding the primary extrudate through the primary die block; extruding, during extrusion of the primary extrudate, the first appendage extrudate through the first die orifice of the first insert die coupled to the primary die block to contact the first appendage extrudate with the primary extrudate to form the leading length of the composite extrusion; replacing, during extrusion of the primary extrudate, the first insert die with the second insert die; and extruding, during extrusion of the primary extrudate, the second appendage extrudate through the second die orifice of the second insert die to contact the second appendage extrudate with the primary extrudate to form the trailing length of the composite extrusion.

3. The method of claim 1, further comprising incorporating a reinforcing member into the primary extrudate.

4. The method of claim 3, further comprising passing the reinforcing member through the primary die block.

5. The method of claim 1, further comprising extruding the first appendage extrudate along a support channel of the primary die block.

6. The method of claim 1, wherein extruding a primary extrudate includes simultaneously extruding a first material and a second different material.

7. The method of claim 1, further comprising cutting the leading length and the trailing length of the composite extrusion to individual weatherseal lengths.

8. The method of claim 1, further comprising configuring the primary extrudate to be a gripping portion having splayed leg portions.

9. The method of claim 1, further comprising clamping the first insert die to the primary die block.

10. A method of forming a composite extrusion having a leading length of a first cross section and a trailing length of a second cross section, comprising:

(a) extruding a primary extrudate through a primary die block;

(b) extruding a first appendage extrudate through a first insert die orifice of a first insert die operably connected to the primary die block;

(c) contacting the primary extrudate and first appendage extrudate to form the leading length;

(d) terminating formation of the first appendage extrudate during extrusion of the primary extrudate;

(e) replacing the first insert die with a second insert die during extrusion of the primary extrudate;

(f) extruding a second appendage extrudate through a second insert die orifice in the second insert die during extrusion of the primary extrudate; and (g) contacting the primary extrudate with the second appendage extrudate to form the trailing length.

11. The method of claim 10, further comprising passing a reinforcing member through the primary die block to attach to the primary extrudate.

12. The method of claim 10, further comprising cutting the leading length and the trailing length into a plurality of sections for individual weatherseals.

13. The method of claim 10, further comprising extruding the primary extrudate to having a pair of spaced leg portions.

14. The method of claim 13, further comprising forming the leg portions in a splayed orientation.

15. A method of forming a composite extrusion, comprising replacing a first insert die having a first insert die orifice, operably coupled to a primary die block with a second insert die having a second insert die orifice, operably coupled to the primary die block during continuous formation of a primary extrudate through the primary die block.

16. The method of claim 15, further comprising maintaining a constant cross section of the primary extrudate during replacing of the first insert die.

17. The method of claim 15, further comprising extruding the primary extrudate to attach to a reinforcing member.

18. The method of claim 15, further comprising maintaining a constant cross section of the primary extrudate during the continuous formation.

19. The method of claim 15, further comprising selectively varying a cross section of the primary extrudate during the continuous formation.

20. The method of claim 15, further comprising passing a reinforcing member through the primary die block during the continuous formation.

21. A method of forming a continuous length of composite extrusion having a leading length and a trailing length, the leading length including a cross section of a primary extrudate and a cross section of a first appendage extrudate, and the trailing length including the cross section of the primary extrudate and a cross section of a second appendage extrudate, the method comprising replacing a first insert die having a first insert die orifice and operably coupled to a primary die block with a second insert die having a second insert die orifice operably coupled to the primary die block during continuous formation of the primary extrudate through the primary die block.

22. The method of claim 21, further comprising extruding the primary extrudate to attach to a reinforcing member.

23. The method of claim 21, further comprising maintaining a constant cross section of the primary extrudate.

24. The method of claim 21, further comprising varying a cross section of the primary extrudate.

25. The method of claim 21, further comprising varying a cross section of the primary extrudate during replacing the first insert die.

26. A method of forming a continuous length of composite extrusion, comprising:
    (a) continuously forming a primary extrudate through a primary die block;
    (b) daring the continuous extrusion, extruding a first appendage extrudate through a first insert die orifice in a first insert die to contact the primary extrudate;
    (c) during the continuous extrusion, replacing the first insert die with a second insert die having a second insert die orifice; and
    (d) during the continuous extrusion, extruding a second appendage extrudate through the second insert die orifice in the second insert die to contact the primary extrudate.

27. The method of claim 26, wherein forming a primary extrudate through a primary die block includes attaching the primary extrudate to a reinforcing member.

28. The method of claim 26, wherein forming a primary extrudate includes extruding a first material and a second material.

29. The method of claim 26, further comprising varying the cross section of the primary extrudate during the continuous forming.

30. A method of forming a continuous composite extrusion having a leading length and a trailing length, the leading length including a cross section of a primary extrudate and a first appendage extrudate and the trailing length including a cross section of the primary extrudate and a second appendage extrudate, the method comprising:
    (a) extruding the primary extrudate through a primary die block and extruding the first appendage extrudate through a first insert die orifice in a first insert die; and
    (b) replacing the first insert die with a second insert die while extruding the primary extrudate through the primary die block and extruding the second appendage extrudate through a second insert die orifice in the second insert die.

31. The method of claim 30, further comprising operably connecting the first insert die and the primary die block.

32. The method of claim 30, further comprising operably connecting the second insert die and the primary die block.

33. The method of claim 30, further comprising varying the cross section of the primary extrudate.

34. The method of claim 30, further comprising passing a reinforcing member through the primary die block to attach to the primary extrudate.

35. The method of claim 30, further comprising varying a cross section of one of the first appendage extrudate and the second appendage extrudate while extruding the primary extrudate.

36. A method of forming a composite extrusion having a leading length and a trailing length, comprising replacing a first insert die having a first insert die orifice defining a portion of a leading length cross section and operably coupled to a primary die block with a second leading insert die having a second insert die orifice defining a portion of a trailing length cross section, operably coupled to the primary die block during continuous formation of a primary extrudate through the primary die block.

37. The method of claim 36, further comprising maintaining a constant cross section of the primary extrudate during replacing of the first insert die.

38. The method of claim 36, further comprising extruding the primary extrudate to attach to a reinforcing member.

39. The method of claim 36, further comprising maintaining a constant cross section of the primary extrudate during the continuous formation.

40. The method of claim 36, further comprising selectively varying a cross section of the primary extrudate during the continuous formation.

41. The method of claim 36, further comprising passing a reinforcing member through the primary die block during the continuous formation.

* * * * *